United States Patent [19]
Schnetzer et al.

[11] Patent Number: 5,632,915
[45] Date of Patent: May 27, 1997

[54] LASER MATERIAL PROCESSING APPARATUS AND A WORK TABLE THEREFOR

[75] Inventors: John F. Schnetzer, Bolton; Mitchell L. Shaney, North Windham, both of Conn.; Michael A. Centracchio, Springfield, Mass.; Richard S. Szewczyk, Madison, Conn.

[73] Assignee: Gerber Garment Technology, Inc., Tolland, Conn.

[21] Appl. No.: 297,599

[22] Filed: Aug. 29, 1994

[51] Int. Cl.⁶ .................................................. B23K 26/00
[52] U.S. Cl. ........................... 219/121.82; 219/121.67; 219/121.84; 198/689.1; 198/850
[58] Field of Search .................... 219/121.58, 121.6, 219/121.63, 121.67, 121.72, 121.82, 121.84; 198/836.1, 837, 689.1, 841, 845, 848, 847, 850, 851; 83/939; 108/20, 22

[56] References Cited

U.S. PATENT DOCUMENTS

| | | |
|---|---|---|
| 3,214,008 | 10/1965 | Warrick .................................... 198/845 |
| 3,811,554 | 5/1974 | Egan ........................................ 198/841 |
| 4,492,304 | 1/1985 | Geiss ........................................ 198/837 |
| 4,646,911 | 3/1987 | Pearl et al. ............................. 198/689.1 |
| 4,672,172 | 6/1987 | Pearl ....................................... 219/121.67 |
| 5,189,936 | 3/1993 | Gerber et al. ......................... 198/851 |
| 5,268,554 | 12/1993 | Ream . | |
| 5,338,914 | 8/1994 | Omote ................................... 219/121.67 |

FOREIGN PATENT DOCUMENTS

| | | | |
|---|---|---|---|
| 62-40985 | 8/1989 | European Pat. Off. ........... | 210/121.67 |
| 2586607 | 3/1987 | France ............................... | 219/121.72 |
| 62-40985 | 2/1987 | Japan ................................. | 219/121.67 |
| 1-245989 | 10/1989 | Japan ................................. | 219/121.67 |

*Primary Examiner*—Teresa J. Walberg
*Assistant Examiner*—Gregory L. Mills
*Attorney, Agent, or Firm*—McCormick, Paulding & Huber

[57] ABSTRACT

A materials processing apparatus for performing a work operation on sheet material with a laser is provided. The apparatus includes a scanning laser which focuses a laser beam onto a work surface along a pre-programmed path. The apparatus also includes a work table which provides a precisely planar support surface for supporting sheet material during a work operation performed by the laser.

10 Claims, 6 Drawing Sheets

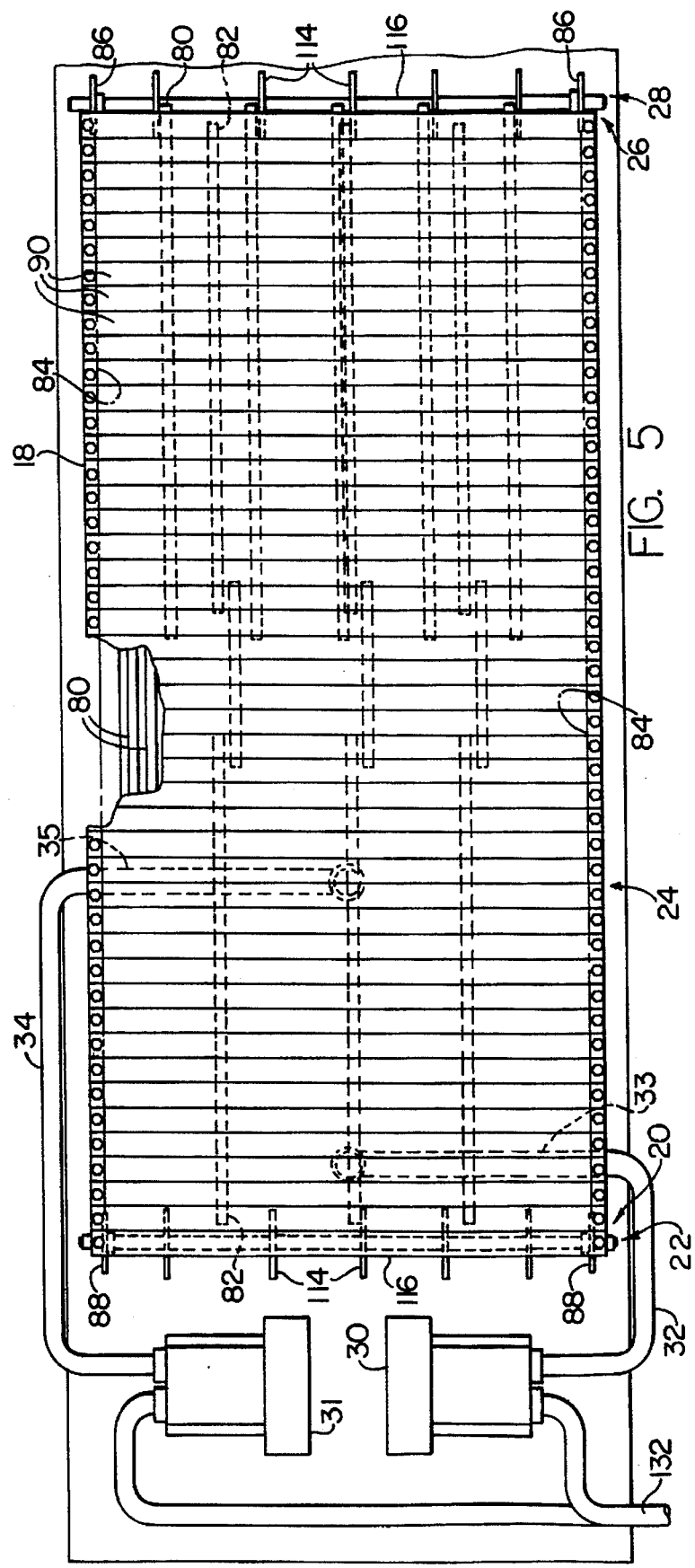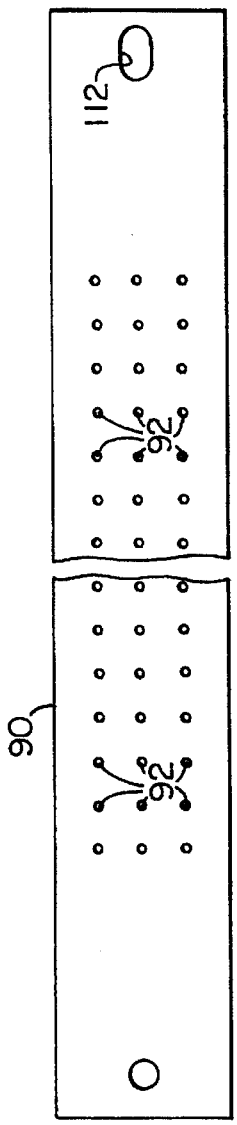
FIG. 5
FIG. 6

LASER MATERIAL PROCESSING APPARATUS AND A WORK TABLE THEREFOR

FIELD OF THE INVENTION

The present invention relates generally to the use of laser systems for materials processing. More particularly, the invention relates to a fully automated laser materials processing apparatus for performing a work operation on sheet materials, such as fabric, and an improved work table for supporting the sheet material during the work operation.

BACKGROUND OF THE INVENTION

Laser systems for performing work operations on sheet material are known. For example, U.S. Pat. No. 5,268,554, the disclosure of which is incorporated herein by reference, describes a laser system which includes a scanning mirror positioned above a support surface for directing the focal point of a laser beam onto sheet material supported on the surface. A flexible drive system is provided for three dimensional operation of the scanning mirror and, accordingly, full three dimensional manipulation of the focal point of the beam with respect to the sheet material. The drive system is operably connected to a controller, such as computerized numerical controller (cnc) or a programmable logic controller (plc), to control the orientation of the scanning mirror and direct the focal point of the beam onto the work material along a pre-programmed path.

Devices of this type may be used to perform a number of materials processing techniques including drilling, cutting, marking, curing and engraving. In particular, scanning laser systems are useful for controlled cutting of limp sheet materials, such as fabric, according to a pre-programmed pattern defined by a plurality of X-Y coordinates.

There are, however, a number of disadvantages associated with the use of such systems, including the inability to precisely position the focal point of the laser beam at a particular X-Y coordinate on the sheet material. In this connection, it should be understood that the laser system is capable, within certain acceptable tolerances, of accurately directing the focal point of the beam to a particular coordinate position on the sheet material. The positioning inaccuracies derive from the topography of the sheet material and/or the support surface. That is, if the work material does not lie flat against the surface and/or the surface is not precisely planar, the focal point of the beam will not fall at the intended coordinate position on the sheet material.

Beam attenuation is a second disadvantage associated with the use of laser systems for materials processing. As explained more fully below, the optical components of a laser system used for materials processing are typically contained within a shrouded enclosure to protect the mirrors and other associated components from damage and to protect the operator of the system from dangerous exposure to the direct laser beam, as well as stray reflections of the beam. Unfortunately, during processing the enclosure quickly becomes clouded with the gases and particulates produced during the work operation. Since the laser beam is typically reflected several times within the enclosure between a number of mirrors and the scanning mirror is positioned well above the support surface (in some systems up to about 100 inches above the surface), significant attenuation can result by the time the beam finally reaches the support surface, if the gases and particulates are not continuously removed from the enclosure. Moreover, the mirrors themselves can quickly become coated with airborne particulates, resulting in improper direction and focusing of the beam by the laser's optical system. This problem is of particular concern in those systems which include a mirror having an upwardly facing reflective surface.

Accordingly, it is an object of the present invention to provide a materials processing apparatus having a precisely planar support surface for supporting sheet material during a work operation.

It is a further object of the invention to provide a work table providing such a support surface.

It is a still further object of the invention to provide such a table wherein the sheet material is held flat against the support surface during the work operation.

It is yet another object of the invention to provide a materials processing apparatus including a laser system, wherein an enclosure containing the laser system's optics is kept free of gases and particulates during the work operation.

SUMMARY OF THE INVENTION

The present invention meets these and other objects by providing a materials processing apparatus and an improved work table therefor. The apparatus includes a laser system for performing a work operation on sheet material, and means for supporting the sheet material during the work operation. The support means includes at least one flexible support member which is engageable with at least one rigid support member. When engaged, the flexible and rigid support members cooperate to define a planar support surface for the sheet material.

Preferably, the means for supporting the sheet material comprises a plurality of flexible slats engageable with a plurality of rigid support rails positioned immediately beneath the slats. When engaged, the slats and rails cooperate to define the support surface.

In one embodiment, the laser is mounted on a conveyorized work table above a work station located on the table between a materials loading station at the infeed end of the table and a materials discharge station at the take-off end of the table. The table includes a conveyor formed by a plurality of flexible slats on which the material is supported as it is moved along by the conveyor, and at least some of the slats that define the upper run of the conveyor are engageable with a plurality of support rails mounted on the table frame immediately below the conveyor's upper run. When engaged, the slats and rails cooperate to define the planar support surface for the sheet material.

It should be understood that the invention is not limited to a conveyor formed by a plurality of flexible slats and that a conveyor formed by any flexible endless belt may be utilized. In fact, almost any type of material support/drive system known to those skilled in the art maybe employed, as long as the system includes flexible and rigid support members which cooperate to define a precisely planar support surface for the sheet material.

Preferably, the conveyorized table is a vacuum table, which is particularly suitable for supporting limp sheet material and holding the material flat against the support surface during the work operation. According to this embodiment of the invention, each one of the slats defines a plurality of airflow passages, and the table includes a plurality of vacuum plenums arranged along the conveyor. Each of the plenums is in fluid communication with the airflow passages defined by a selected group of slats. Means are provided for selectively evacuating the plenums, which causes the corresponding slats to be pulled down against the underlying support rails. Likewise, sheet material supported on a group of slats to which vacuum is applied will be drawn down flat against the slats. By providing a number of selectively evacuated plenums, the size of the support surface as well as the amount of vacuum applied at selected areas of the surface can be controlled.

The conveyorized vacuum table also includes a pair of drive chains mounted along the sides of the conveyor within associated chain guides, and a pair of sprockets rotatably mounted at the infeed and take-off ends of the conveyor for supporting and driving the chains. To counter errors in planarity of the support surface resulting form tolerances in the chain and its associated guides, means are provided for resiliently supporting the slats on the chain. Means are also provided for slidably mounting the flexible slats on the chain so that the slats are not bowed by any lateral movement of the chains on the sprockets or within the guides. Finally, means are also provided for holding the flexible slats against the ends of the conveyor to prevent excessive bowing as the slats are rotated around the sprockets mounted at the ends of the conveyor.

In the preferred embodiment of the invention, the laser's optics are mounted above the table in a protective enclosure, which also serves to protect the operator of the apparatus from exposure to the laser beam. As noted above, the atmosphere within such an enclosure can quickly become clouded with gases and dust from the work operation. Accordingly, in the preferred embodiment of the invention, the evacuating means not only draws air from the plenums, but also exhausts air from the enclosure and directs all of the air to an filtration device. The device, which may be a scrubber, extracts potentially harmful gases and particulates from the air, and the clean air is then recirculated back into the enclosure. The circulation system insures that the air within the enclosure does not adversely affect the operation of the laser.

The materials processing apparatus taught by the invention is a fully automated system capable of performing precise work operations on a single ply or several plies of sheet material, particularly limp sheet material, such as textile fabrics of all types as may be found in apparel, industrial, automotive, aircraft and other soft goods applications.

BRIEF DESCRIPTION OF THE DRAWINGS

FIG. 5 is a top view of the work table which forms a part of the apparatus shown in FIG. 1.

FIG. 6 is a top plan view of one of a plurality of slats which forms a part of the conveyor shown in FIGS. 1.

DESCRIPTION OF THE PREFERRED EMBODIMENT

Figure 1:
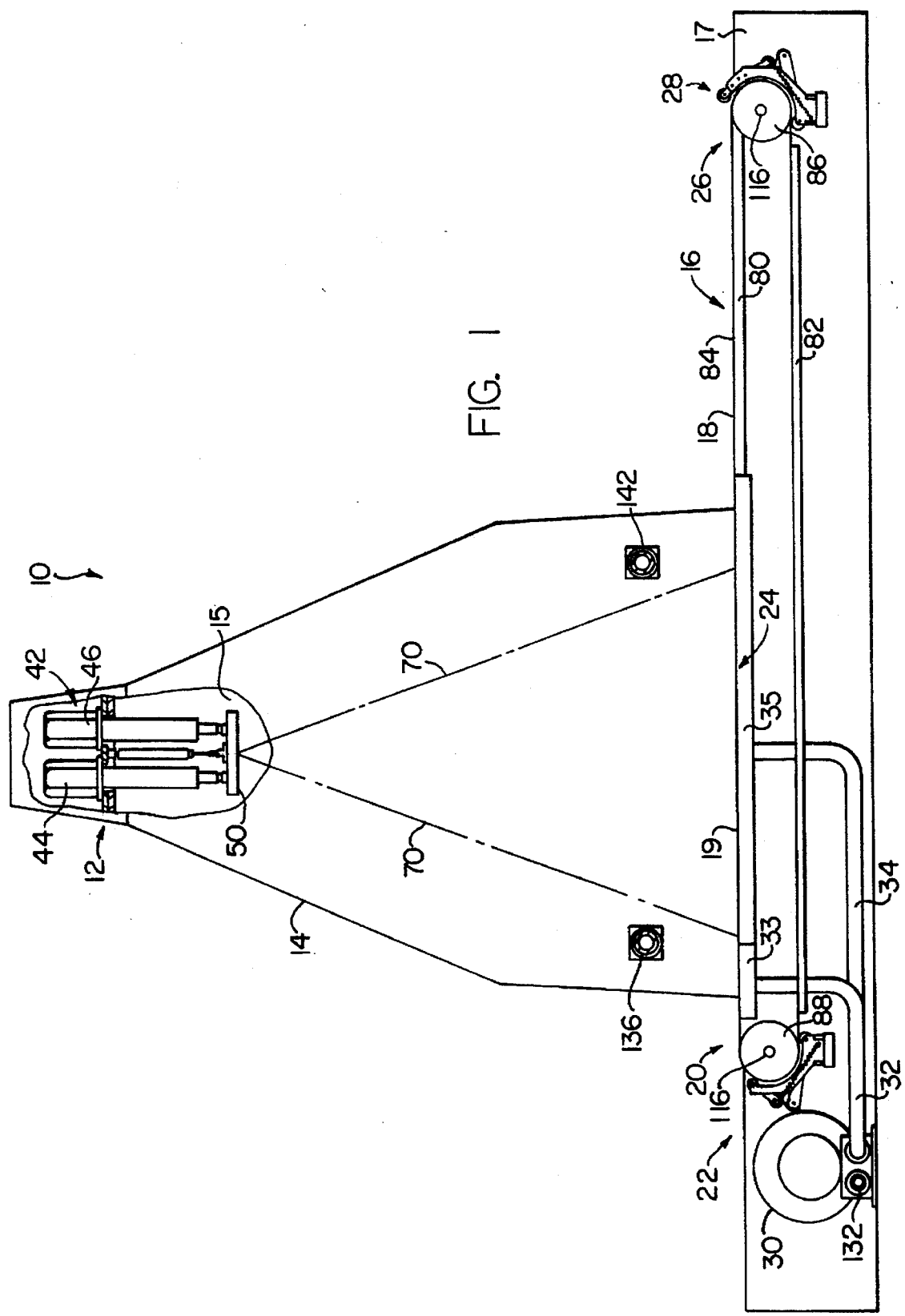
FIG. 1 is a side view of a materials processing apparatus according to the invention.

FIG. 1 illustrates a materials processing apparatus embodying the invention. The apparatus, generally designated 10, includes a scanning laser system 12 (shown in detail in FIG. 2) and an associated protective shroud 14, which forms an enclosure 15 for the system's optical components. The shroud and the laser's optics are mounted on a vacuum table, generally designated 16. The table includes a frame 17 which supports a conveyor 18 for transporting sheet material, which may be limp sheet material such as fabric, from a materials loading station 20, located at the infeed end 22 of the conveyor, to a work station 24, located below the laser system 12 where the laser performs a work operation on the material. After the work operation is completed, the conveyor advances the sheet material to a materials discharge station 26 located at the take-off end 28 of the conveyor. The table 16 further includes a vacuum generator 30 which connects via duct 32 with a vacuum plenum 33, arranged below the materials loading station. A second vacuum generator 31 connects via duct 34 with a vacuum plenum 35, arranged below the work station 24. Thus, separately controlled vacuum can be applied at the loading and work stations, as will be explained in further detail below.

In the preferred embodiment of the invention, the shroud 14 includes a large viewing port (not shown) which allows the operator of the apparatus to view the work operation. In addition, a deflector (also not shown) is mounted at each end of the shroud along its base where the sheet material enters and exits the work station. The deflector which may be a flexible strip of flexible material attached to the shroud or a roller mounted to the table frame serves to close any gaps that may exist between the base of the shroud and the sheet material. Thus, the chances that any stray reflections of the laser beam will escape the enclosure during the work operation are even further reduced.

While the apparatus illustrated in FIG. 1 is particularly suitable for fully automated laser cutting of fabric or other limp sheet materials, it should be understood that the invention is not limited in this regard. The apparatus may be used for performing a number of other laser materials processing techniques on sheet material, such as, for example, marking and drilling.

Figure 2:
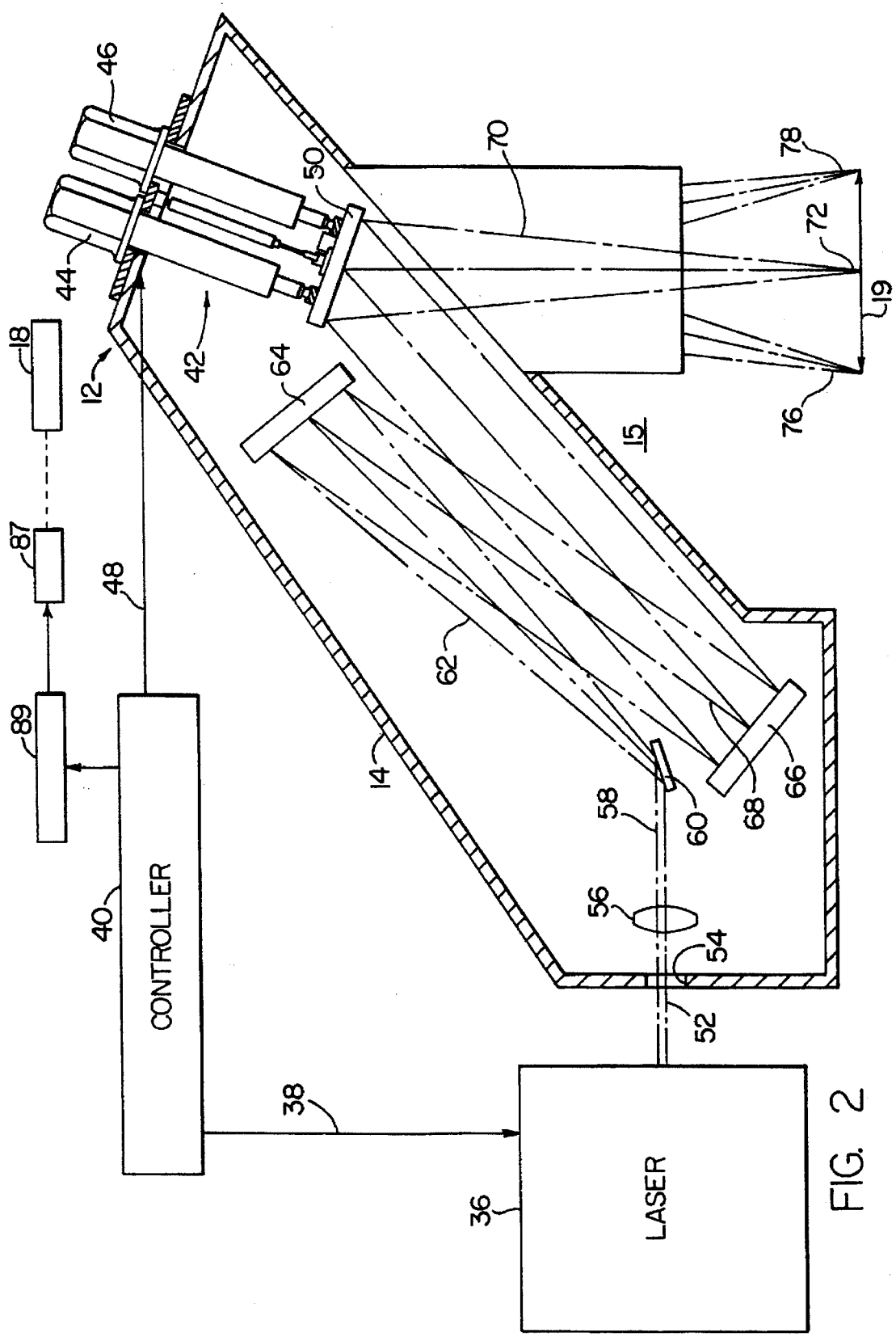
FIG. 2 is a side view of the laser system which forms a part of the apparatus shown in FIG. 1.

Referring now to FIG. 2, the laser system 12 will be discussed in more detail. The laser system is a scanning laser system of the type fully disclosed in U.S. Pat. No. 5,268,554 and available from General Electric Co., New York, N.Y. The system includes a high power industrial laser 36, which in the preferred embodiment is a 1500 watt $CO_2$ laser. The laser is operably connected by means of a flexible connector 38 to a controller 40, which as noted above may be a cnc or plc controller. The controller connects with a scanner assembly 42 and three servo motors 44, 46 (a third servo motor is not shown) by means of a second flexible connector 48 to control the orientation of the large scanning mirror 50.

In operation, the laser beam 52 passes through an opening 54 in the shroud 14 and then through a negative (diverging) spherical lens 56. The cylindrically corrected diverging beam 58 is reflected at a 45 degree angle by a first flat mirror 60. The continually diverging beam 62 is reflected by a second flat mirror 64 to a large spherical or parabolic mirror 66. The curvatures of the mirror 66 and the lens 56, their separation distances and the angle of incidence of the diverging beam 68 with respect to the optical axis of mirror 66 are designed such that the converging beam 70 will reach a focal point 72 that is corrected for astigmatism. The position of the focal point 72 on a support surface, in this case the support surface 19 defined by the conveyor at the work station 24, is determined by the position of the flat scanning mirror 50. The laser focal point 72 may be manipulated rapidly to other positions, for example 76, 78 indicated in phantom, by programmed motion of the scanning mirror.

Full three dimensional operation of the scanning mirror 50 and corresponding manipulation of the focal point 72 requires three servo motors (as noted previously only two such motors 44, 46 are shown). The motors are individually rotated by means of the controller 40 according to predetermined position information. Accordingly, there is a unique position of the three servo motors for each position of the laser focal point 72 on the support surface 19. Thus, the laser beam can be manipulated to move quickly and smoothly along a programmed path on the support surface to, for example, cut a pattern piece from a sheet of fabric supported on the surface 19. In this illustrated embodiment, the scanning mirror 50 is positioned about 100 inches above the support surface 19, and the focal point of the beam can be directed over a 72'×72' area.

A more complete description of the scanning laser system and the manner in which the beam is manipulated may be found in the above-cited U.S. patent.

Referring now to FIGS. 1, 3, 4 and 5, the table frame 17 includes upper support rails 80 and lower support rails 82 for supporting the conveyor 18. The conveyor itself includes a pair of drive chains 84 (one shown) mounted with chain guides 98 (See FIG. 7) along each side of the conveyor and supported on a corresponding pair of drive sprockets 86 rotatably mounted on the frame 17 at the take-off end 28 of the conveyor. A pair of idler sprockets 88 rotatably support the chain at the infeed end 22 of the conveyor. A number of flexible slats 90 are mounted to the chain and define the upper and lower runs of the conveyor.

As shown schematically in FIG. 2, the conveyor 18 is driven by a drive motor 87 connected to the sprockets 86. The drive motor 87 is actuated by command signals received from a controller 89 and causes the conveyor to advance the sheet material between the materials loading station and the work station and between the work station and the materials discharge station, according to the command signals. The controller 89 sits in the foreground to the controller 40, and the two are connected through a direct numeric control (DNC) link. The controller 89 directs the conveyor to advance the sheet material one byte at a time after the controller 40 indicates that a particular work operation is complete.

Returning again to the construction of the conveyor, in the preferred embodiment of the invention, the slats are formed from 0.09 inch thick stainless steel. The slats are 4 inches wide and are placed 0.020 inches apart. While it should be understood that the invention is not limited as to the particular slat dimensions illustrated or the stainless steel composition of the slats, the slats must be formed from a material which is capable of withstanding the effects of the high-energy laser and must be flexible enough to permit the slats to be drawn down against the upper support rails when vacuum is applied to the upper run of the conveyor through the plenums 33 and 35, as will be explained more fully below.

As shown in FIG. 5, the upper support rails 80 are spaced more closely together at the materials loading station 20 and the work station 24 than at the materials discharge station 26. For example, in the preferred embodiment of the invention the upper support rails 80 lying immediately beneath the loading and work stations are spaced at about 3 inch intervals across the 83.5 inch width of the conveyor. However, at the materials discharge station only five upper support rails are provided. Moreover, the upper support rails lying below the loading and work stations are shimmed or otherwise adjusted in a vertical plane with respect to the frame 17 to provide a precisely planar support for the slats 90. Thus, when the slats are drawn flat against the runners by vacuum, a support surface having the required planarity is provided for the sheet material. In the preferred embodiment, the support surface is planar within 0.005 inches; however, in some applications less rigid tolerances are required.

The support rails underlying the materials loading station are not subjected to the laser beam; accordingly, they need not be formed from a material that will withstand the effects of the beam. The primary concern at the loading station is that the rails have a low enough coefficient of friction so that the stainless steel slats glide smoothly over the rails as the conveyor is driven. In the preferred embodiment of the invention, the rails underlying the loading station are formed from Teflon coated aluminum; however, other suitable materials may be substituted.

At the work station, the problem is two-fold: the rails must be able to withstand the effects of the laser, as noted above, and the rails must again present a low enough coefficient of friction so that the slats glide smoothly over them. Upper support rails formed from an oil impregnated bronze, a material known to those skilled in the art as oil light bronze, have been found to be particularly suitable. Again, as in the case of the support rails underlying the loading station, other suitable materials may be substituted for the oil impregnated bronze rails, as long as the rails provide a low enough coefficient of friction so that the slats glide smoothly over the rails.

At the materials discharge station and along the lower run of the conveyor where the slats engage the lower support rails, neither of these concerns is critical. The lower support runners have very little or no exposure to the laser beam, and it is not required that the slats slide over the rails with as little frictional drag as possible. Accordingly, the rails in these areas are formed from a high molecular weight plastic.

As mentioned above, vacuum generator 30 communicates through duct 32 with plenum 33 arranged below the loading station, and vacuum generator 31 communicates through duct 34 with plenum 35 arranged below the work station. When the generators evacuate the plenums, the overlying flexible slats are drawn down against the rails. Since the support rails define a precisely planar surface at the loading and work stations, within 0.005 inches of planarity in the preferred embodiment, the support surface 19 defined by the upper run of the conveyor when the slats engage the rails exhibits the same degree of planarity. Thus, the position of the laser beam's focal point with respect to the support surface will not be affected by the topography of the surface.

In addition, as shown in FIG. 6, the slats 90 are provided with a number of apertures 92,92 which define airflow passages in fluid communication with the underlying plenums. Thus, when the generator evacuates the plenums, vacuum is also applied at the support surface 19 defined by the slats, which serves to hold sheet material lying on the slats firmly against the support surface. Accordingly, the position of the laser beam's focal point is not affected by folds or creases of the sheet material.

The apertures 92,92 must provide a uniform pattern of sufficient airflow to hold the sheet material firmly against the support surface as the conveyor transports the material and supports the material during the work operation. However, the apertures cannot be so large that the sheet material is drawn into the apertures when vacuum is applied. Further, the apertures should be sized to minimize the possibility that the laser beam will pass through the support surface 19 and impinge on hardware located below the upper run of the conveyor. Accordingly, in the preferred embodiment of the invention, the apertures have a diameter of about 0.06 inches and are spaced apart about 1 inch on center according to the pattern shown in FIG. 6.

Separate vacuum systems are provided for the loading and work stations so that the amount of vacuum applied in these areas can be controlled individually. More vacuum is required at the loading station than at the work station because the sheet material is typically pulled from a supply roll mounted at the infeed end of the table down onto the conveyor. Thus, significant vacuum has to be applied at the loading station to insure that the material being pulled down onto the conveyor is quickly drawn flat against the slats prior to reaching the work station. This objective is accomplished by providing a separate plenum and vacuum generator for the loading station. Moreover, such an arrangement allows the loading station to have a much smaller linear extent than would be the case if vacuum was applied equally to both the loading station and the work station by a single generator evacuating a single plenum.

Figure 3:
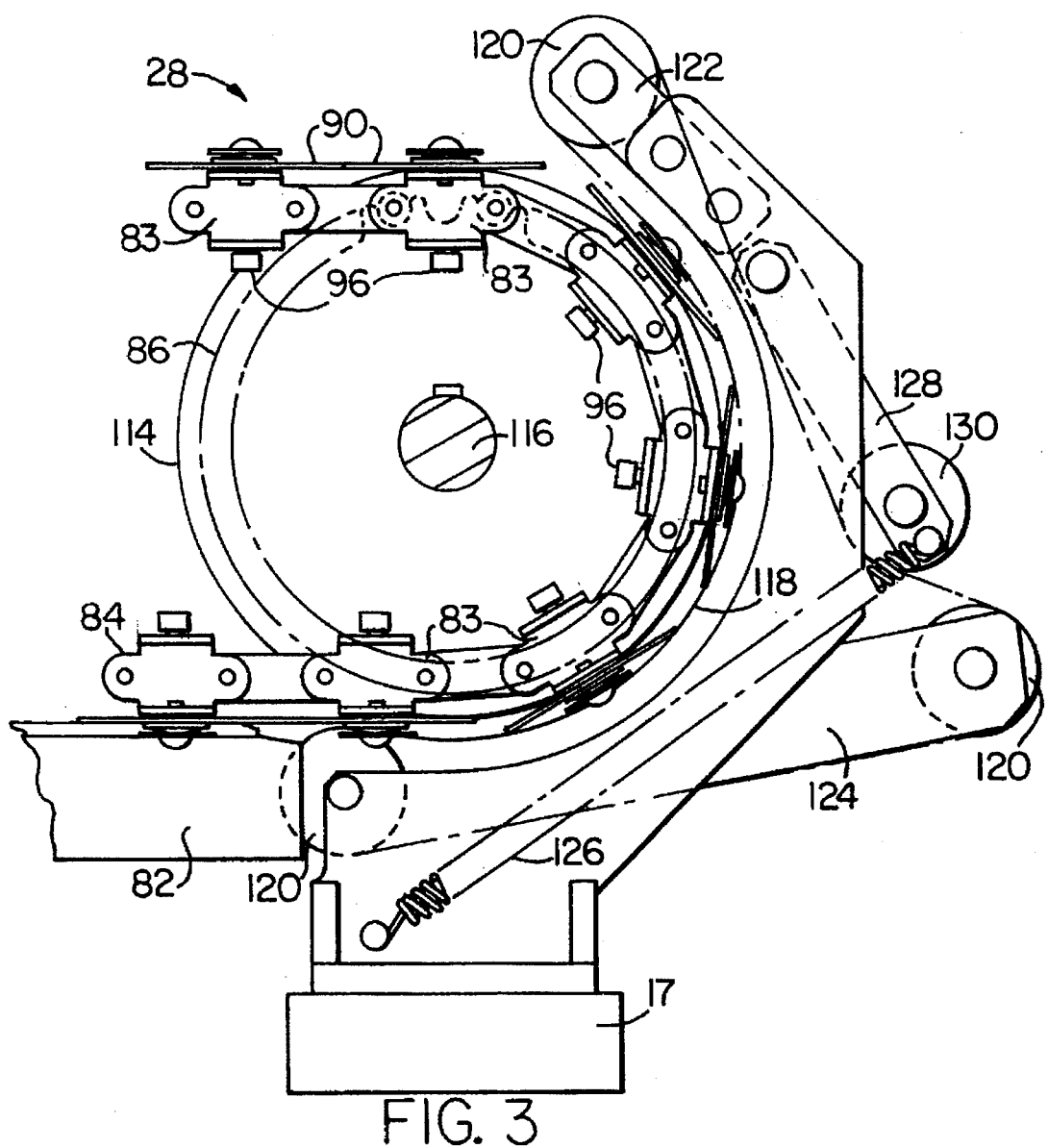
FIG. 3 is a side view of the take-off end of the conveyor which forms a part of the apparatus shown in FIG. 1.
Figure 4:
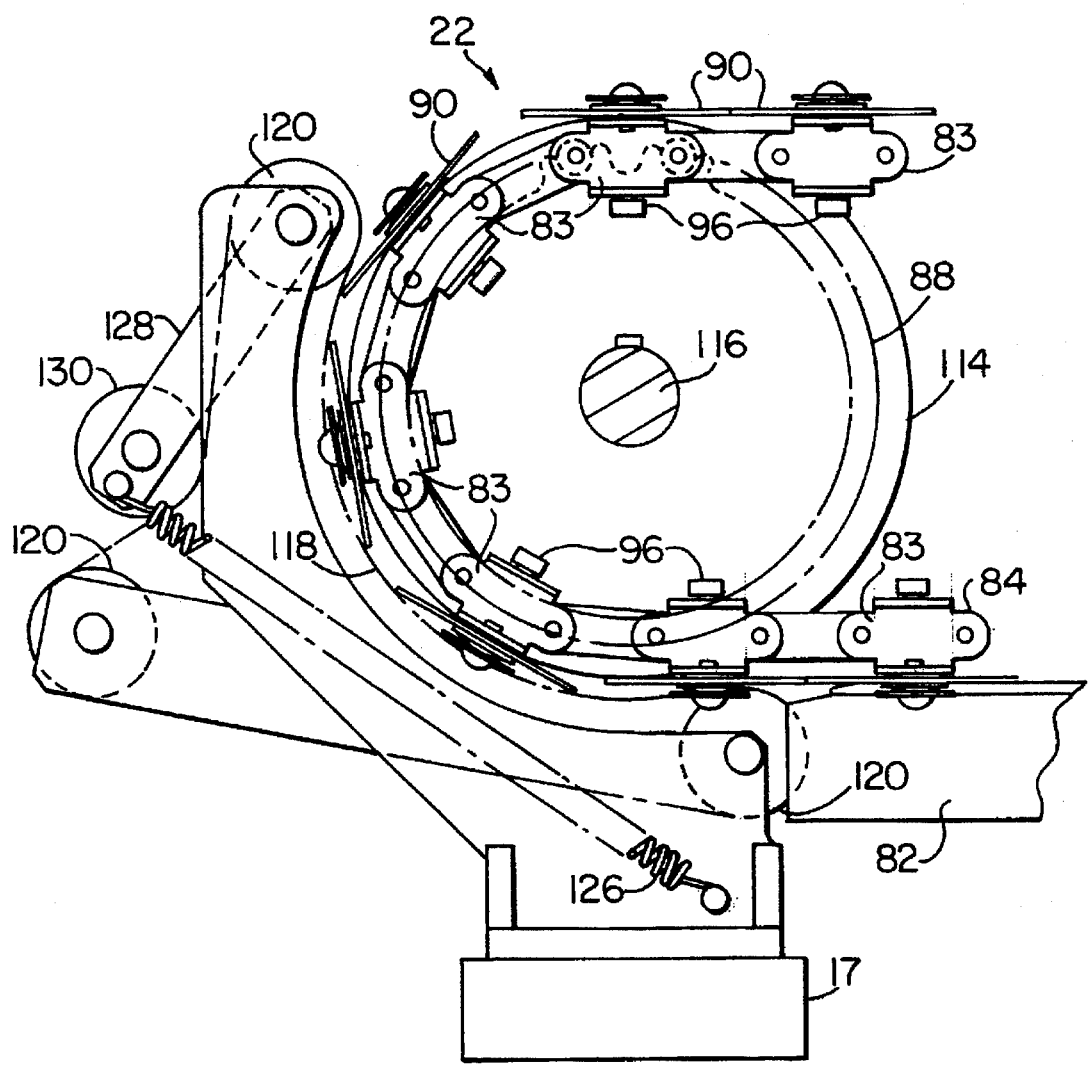
FIG. 4 is a side view of the infeed end of the conveyor which forms a part of the apparatus shown in FIG. 1.
Figure 7:
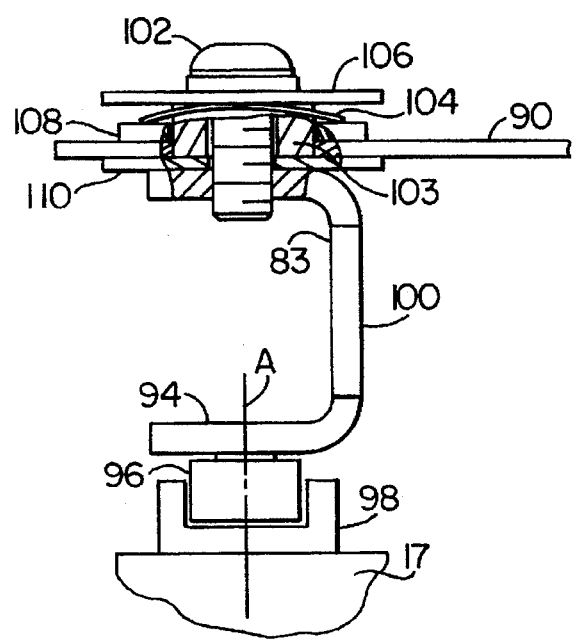
FIG. 7 is a partial front view of the table shown in FIG. 5.

Referring now to FIGS. 3, 4 and 7, it can be seen that each link 83 of the chain 84 includes a flange 94 which carries a roller 96 rotatable about a vertical axis A. In order to guide the conveyor through its upper run, the frame 17 includes a pair of generally U-shaped chain guides 98, each extending along a respective side of the conveyor and capturing the rollers 96. Each link of the chain also includes an upwardly extending stem 100 to which a respective slat is resiliently mounted. Resilient mounting of the slats to the chain insures that the slats will be held flat against the support rails when vacuum is applied, despite tolerances in the chains or their associated guides.

In this connection, it should be understood that to avoid having to take the tolerances of the chains and their associated guides into account when mounting the slats, the slats are mounted to the chain stems at a point slightly below the plane defined by the upper surface of the support rails 80. This causes a slight upward bow in the middle portion of the flexible slats as the slats extend across the conveyor. When vacuum is applied, the slats are drawn flat against the rails which tends to drive the ends of the slats upward. By resiliently mounting the slats to the chain, the ends of the slats are free to move upwardly as the middle portion of each slat is drawn down onto the support rails. In the preferred embodiment of the invention this is accomplished by means of a cap screw 102 which extends through the slat within a spacer 103 to attach the slat to the stem 100 of each chain link. A spring washer 104 positioned between two standard washers 106 and 108 is provided on the upper side of the slat; a standard washer 110 is also provided between the underside of the slat and the link stem 100. This arrangement spring loads the slat vertically upward with respect to the chain and allows the end of the slat to move upward as the slat is drawn down tightly against the support rails.

Lateral movement of the chains 84 with the guides 98 and on the sprockets 86 and 88 is inherent. To prevent the flexible slats from bowing irrespective of the lateral movement of the chains, a slot 112 is provided at one end of each slat for the cap screw 102, as shown in FIG. 6 Thus, the chains are free to move laterally within the chain guides and on the sprockets to a degree defined by the lateral extent of the slots 112.

Bowing of the flexible slats also tends to occur as the slats are rotated about the radius of the sprockets 86 and 88 at the take-off and inlet ends of the conveyor. This is due to the flexibility of the slats, their weight and centrifugal force. To prevent the slats from bowing at these locations, means are provided to hold the slats against the ends of the conveyor. As shown in FIGS. 1, 3 and 4, five disks 114 are spaced across each end of the conveyor and rotatably mounted to the sprocket shafts 116. At the middle three disk locations, a belt 118 wrapped around three crowned pulleys 120 is spring loaded against the slats 90 to hold the slats against the disks as the slats are driven around the ends of the conveyor. The crowned pulleys are mounted on upper and lower arms 122 and 124, respectively, which are attached to the frame 17. The belt 118 is spring loaded against the slats by spring 126 which is attached at its lower end to the frame 17 and at its upper end to idler pulley lever 128. As the spring pulls the lever 128 down toward the disk 114, an idler pulley 130 mounted on the lever presses the belt 118 against the slats 90. Thus, the flexible slats are urged firmly against the disks and bowing of the slots is prevented.

Figure 8:
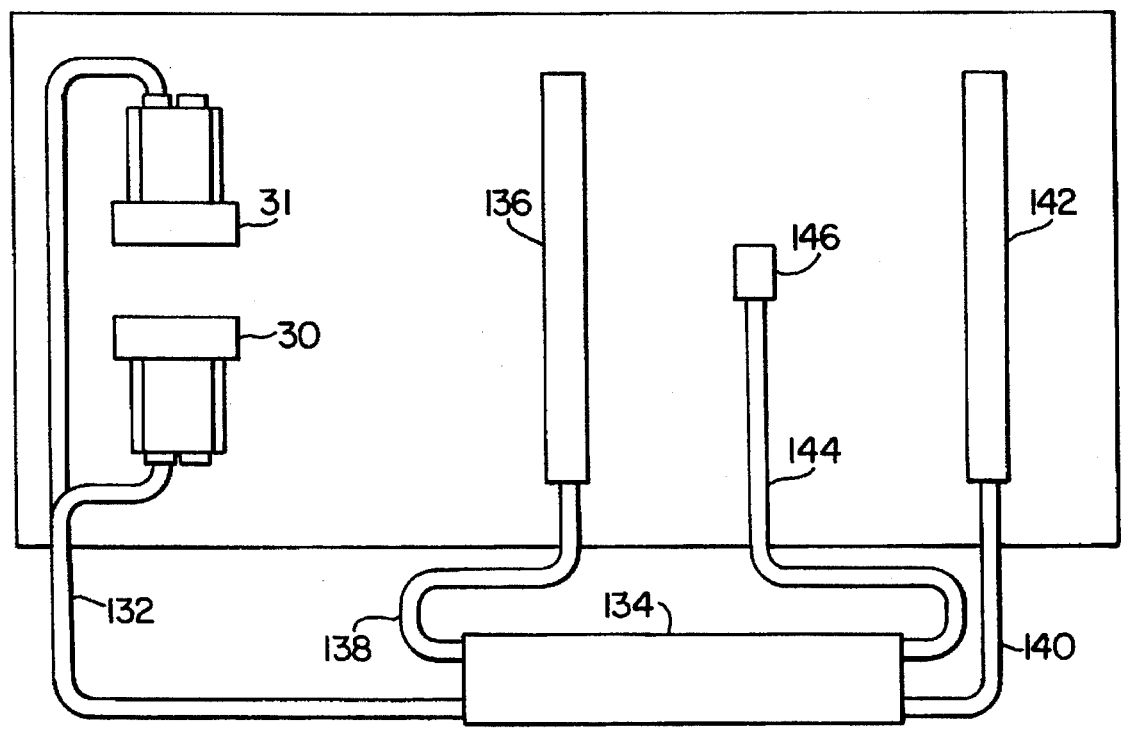
FIG. 8 is a partially schematic diagram of the air filtration and circulation system of the apparatus shown in FIG. 1.

Referring now to FIG. 8, the air filtration and circulation system of the apparatus will be explained. As shown in FIG. 8, air evacuated from the plenums by the vacuum generators 30 and 31 passes through a common exhaust duct 132 to an air filtration apparatus or scrubber 134. Air from the enclosure 15 contaminated with gases and particulates generated during the work operation is withdrawn from the enclosure by the scrubber through outlet 136 via exhaust duct 138. After the air is cleaned, it is recycled from the scrubber to the enclosure 15 through duct 140 and an inlet 142 arranged along one end of the shroud 14 at its base. Clean air is also returned from the scrubber to the enclosure through duct 144 and a second inlet 146 located in the shroud approximately half way between its base and the scanning mirror 50. The illustrated air filtration and circulation system insures that contaminated air is continuously removed from the enclosure during the work operation and that a continuous supply of clean air is provided for the enclosure.

While preferred embodiments have been shown and described, various modifications and substitutions may be made without departing from the spirit and scope of the invention. Accordingly, it is to be understood that the present invention has been described by way of example and not by limitation.

We claim:

1. A materials processing apparatus comprising:

a laser for performing a work operation on sheet material;

a work table for supporting the sheet material during the work operation;

a closed loop conveyor mounted on the work table and including a plurality of flexible slats defining a plurality of airflow passages therethrough, at least some of the slats defining an upper run of the conveyor, the upper run being engageable with a plurality of rigid support rails mounted on the work table below the upper run of the conveyor, the slats and the support rails cooperating when engaged to define the support surface;

a vacuum plenum arranged along the conveyor in fluid communication with the airflow passages; and evacuating means mounted on the table in fluid communication with the plenum to evacuate the plenum and cause the slats to engage the rails and define the support surface, and the sheet material supported on the surface to be held flat against the surface.

2. The apparatus of claim 1 wherein:

the table comprises a plurality of vacuum plenums arranged along the conveyor, each plenum being in fluid communication with the airflow passages defined by selected ones of slats, and the evacuating means includes means for selectively evacuating each plenum.

3. The apparatus of claim 2 wherein each of the plenums has an associated evacuating means.

4. The apparatus of claim 1 wherein:

the optical components of the laser are supported on the table above the conveyor and within an enclosure, and the evacuating means comprises means for causing airflow through the enclosure.

5. A materials processing apparatus comprising:

a work table having a work surface for supporting sheet material during a work operation;

a laser system mounted above the work table for performing a work operation on the sheet material;

a closed loop conveyor mounted on the table, the conveyor including a plurality of flexible slats defining a plurality of airflow passages therethrough, at least some of the slats defining the upper run of the conveyor;

a plurality of support rails mounted on the table below the upper run of the conveyor, the slats defining the upper run of the conveyor being engageable with the support rails, the slats and rails when engaged defining the work surface;

a vacuum plenum in fluid communication with the plurality of airflow passages defined by the slats; and evacuating means in fluid communication with the plenum to evacuate the plenum and cause the slats defining the upper run of the conveyor to engage the support rails and to hold the sheet material flat against the support surface.

6. The apparatus of claim 5 comprising:

a pair of drive chains mounted to the conveyor;

a pair of sprockets rotatably mounted at an end and a take-off end of the conveyor for supporting and driving the chains;

means for resiliently supporting the slats on the chains; and means for holding the slats against the infeed and take-off ends of the conveyor as the slats are rotated about the sprockets.

7. A work table for supporting sheet material during a work operation, said table comprising:

a closed loop conveyor mounted on the work table and including a plurality of flexible slats defining a plurality of airflow passages therethrough, at least some of the slats defining an upper run of the conveyor, the upper run being engageable with a plurality of rigid support rails mounted on the work table below the upper run of the conveyor, the slats and the support rails cooperating when engaged to define the support surface;

a vacuum plenum arranged along the conveyor in fluid communication with the airflow passages; and evacuating means mounted on the table in fluid communication with the plenum to evacuate the plenum and cause the slats defining the support surface to engage the rails and the sheet material supported on the surface to be held flat against the support surface.

8. The work table of claim 7 wherein:

the table comprises a plurality of vacuum plenums arranged along the conveyor, each plenum being in fluid communication with the airflow passages defined by selected ones of slats, and wherein the evacuating means includes means for selectively evacuating each plenum.

9. The work table of claim 8 wherein each of the plenums has an associated evacuating means.

10. A conveyor table for work on sheet material comprising:

a closed loop conveyor for transporting the sheet material to and from a work station located between a material loading station an a material discharge station, and including;

(a) a plurality of flexible slats defining upper and lower runs of the conveyor and further defining a plurality of airflow passage therethrough;

(b) a pair of drive chains mounted to the conveyor;

(c) a pair of sprockets rotatably mounted at an infeed end and a take-off end of the conveyor for supporting and driving the chains;

(d) means for supporting the slats on the chains including means for biasing the slats vertically upward with respect to the chains and means permitting movement of the slats laterally with respect to the chains; and (e) means for holding the slats against the infeed and take-off ends of the conveyor;

a plurality of support rails mounted on the table below the upper run of the conveyor;

a first vacuum chamber located below the upper run of the conveyor at the loading station and in fluid communication with the airflow passages of the slats defining the upper run of the conveyor at the loading station;

a second vacuum chamber located below the upper run of the conveyor at the work station and in fluid communication with the airflow passages of the slats defining the upper run of the conveyor at the work station; and evacuating mans mounted in the table in fluid communication with the first and second plenums for selectively evacuating the plenums and causing the respective slats to engage the support rails and define a support surface for the sheet material.

* * * * *